June 26, 1956     R. S. FORD     2,751,943
SELF-PROPELLED HYDRAULIC CLEAVING MACHINE FOR FELLING
AND BUCKING TREES IN LOGGING OPERATIONS
Filed March 7, 1952     4 Sheets-Sheet 1
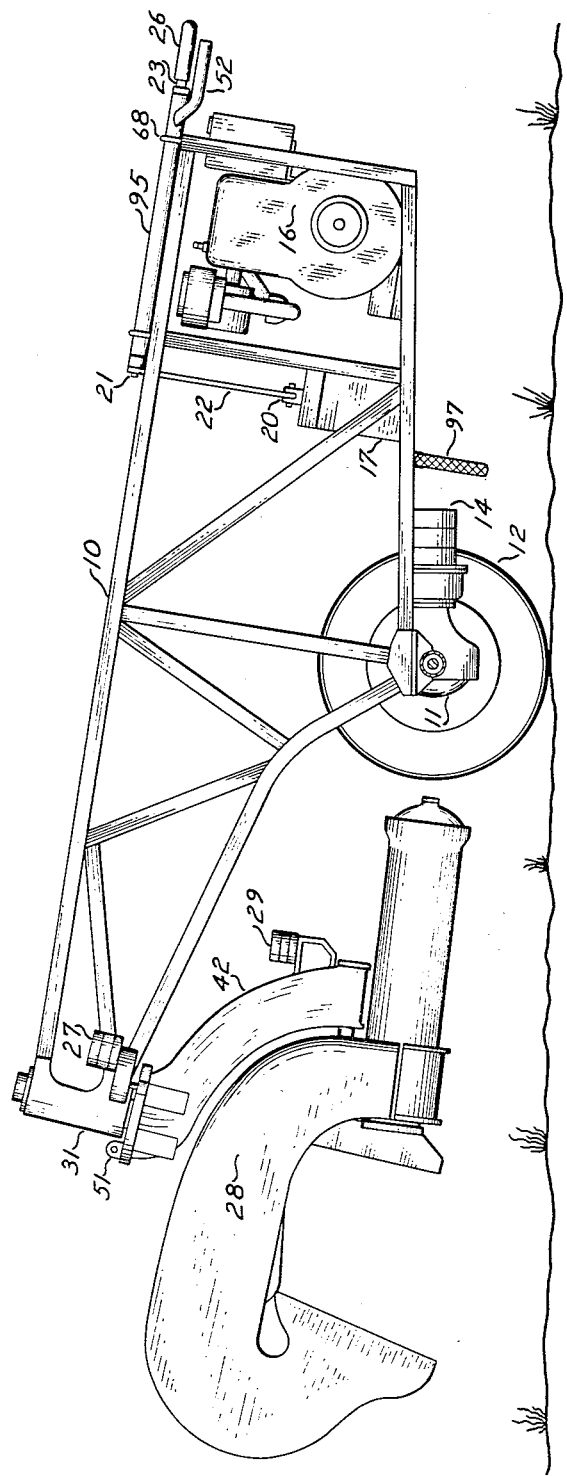
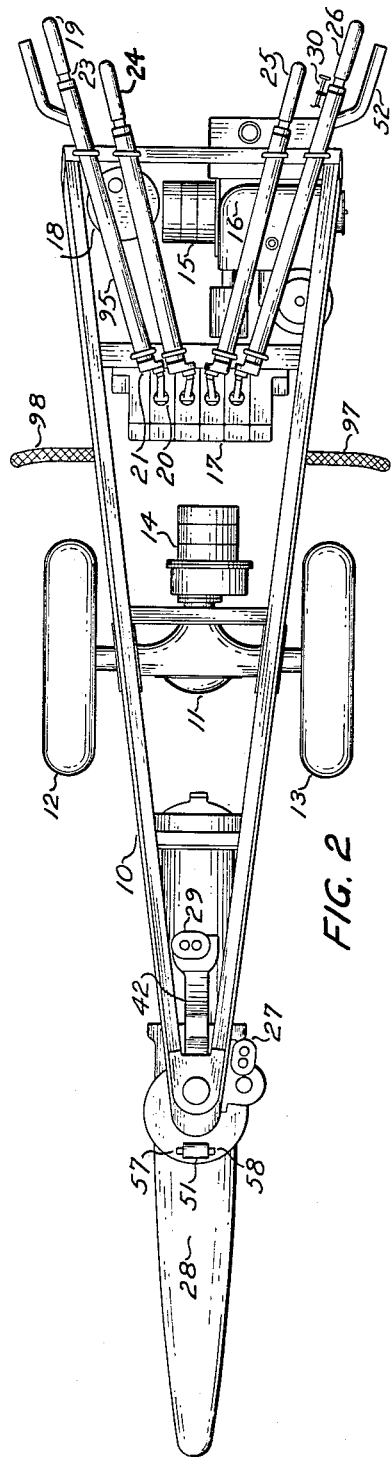
*Robert S. Ford*
INVENTOR June 26, 1956 R. S. FORD 2,751,943
SELF-PROPELLED HYDRAULIC CLEAVING MACHINE FOR FELLING
AND BUCKING TREES IN LOGGING OPERATIONS
Filed March 7, 1952 4 Sheets-Sheet 2
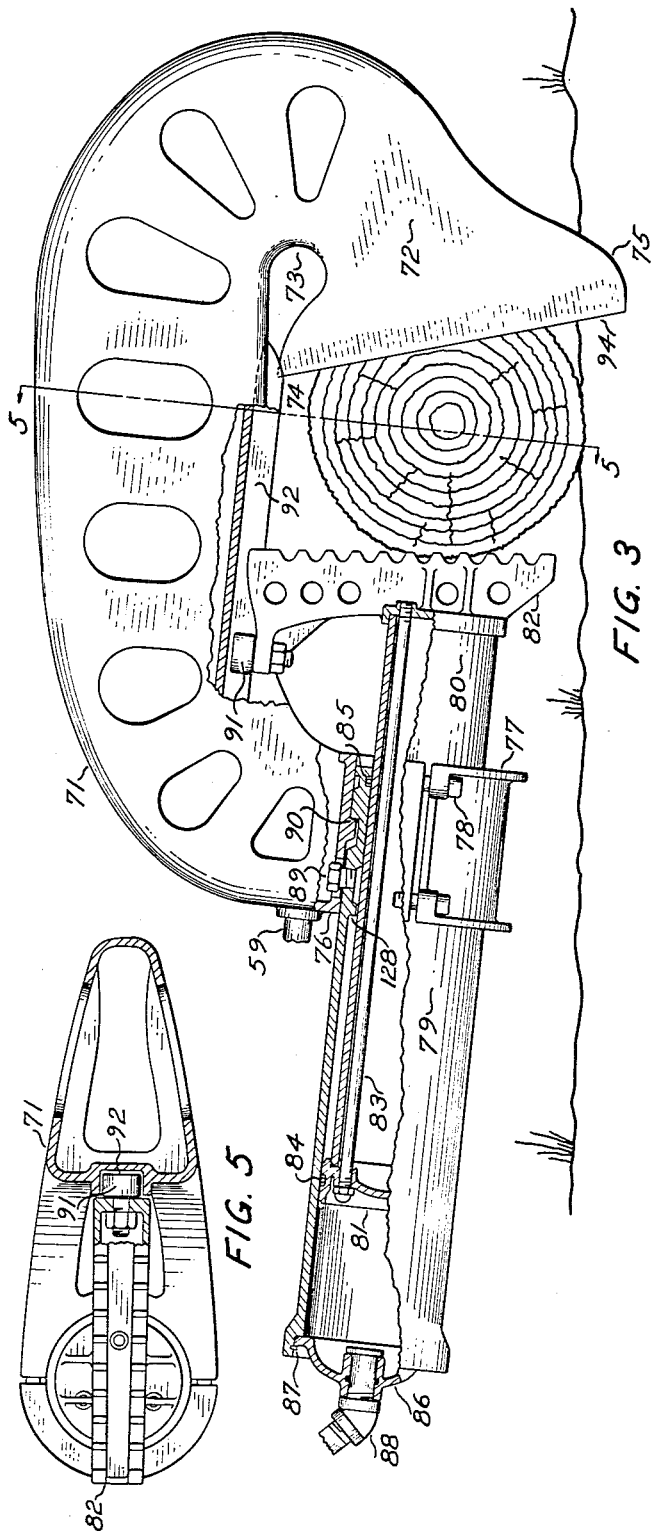
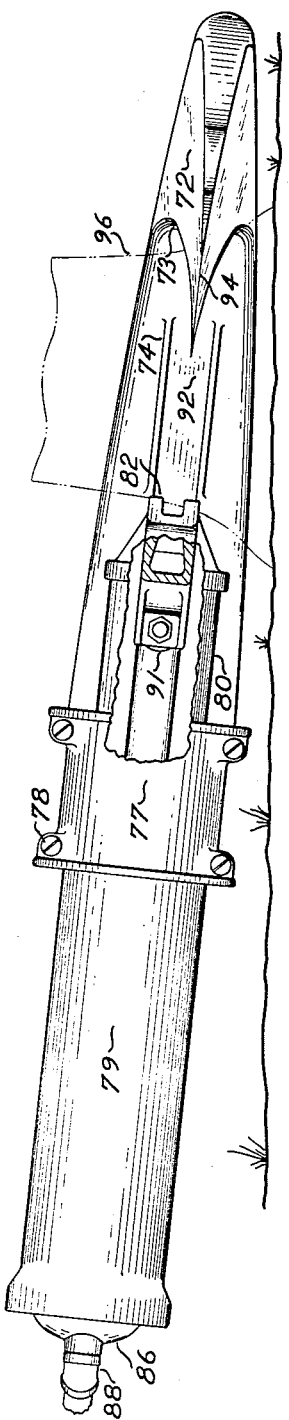
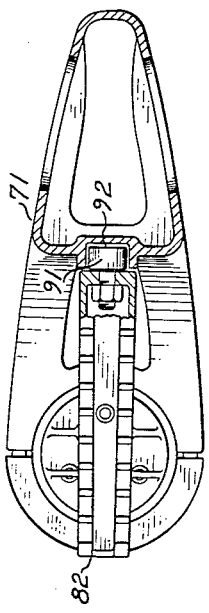
Robert S. Ford
INVENTOR

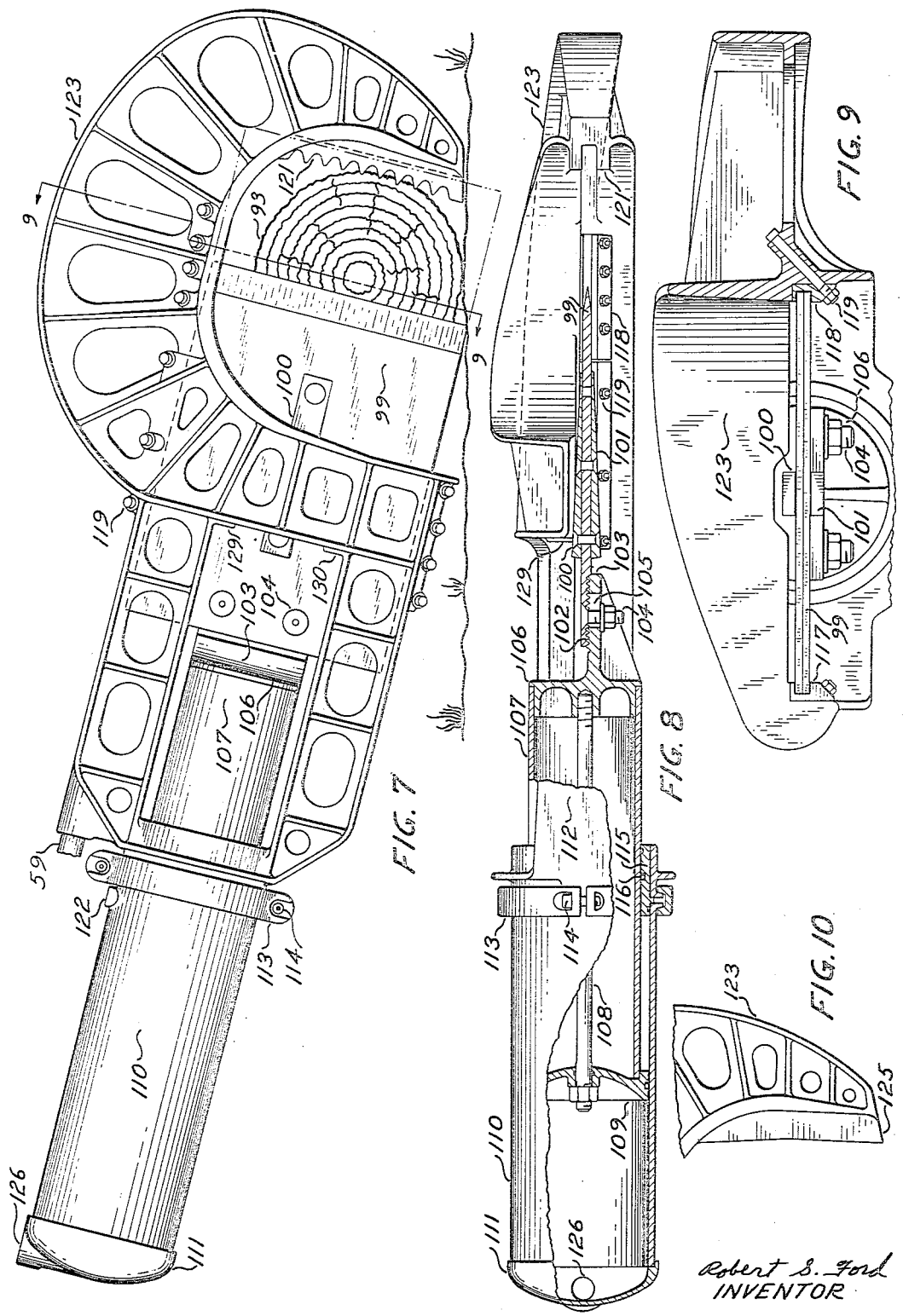

United States Patent Office

2,751,943
Patented June 26, 1956

2,751,943

SELF-PROPELLED HYDRAULIC CLEAVING MACHINE FOR FELLING AND BUCKING TREES IN LOGGING OPERATIONS

Robert S. Ford, Pascagoula, Miss.

Application March 7, 1952, Serial No. 275,361

7 Claims. (Cl. 144—34)

My invention relates to power driven machines for severing tree trunks by forcing a straight edged blade through the tree in one continuous stroke without reciprocation. Though at first glance it seems fantastic to cut trees in any such radical manner, the fact is that I have built and now have in my possession such a machine, which has been successfully tested in cutting trees of many varieties up to a diameter of 13½". This particular machine fells a 13½" pine tree in 8 to 10 seconds, then bucks the fallen tree completely into pulpwood bolts in less than 2 minutes more. The cut surfaces are absolutely clean and flat with no splintering whatever.

A few inventors at various times in the past century have tried to develop tree cutting machines to work in this manner, but only the most rudimentary forms were produced, which apparently did not come into practical use. However, these earlier inventors were certainly justified in believing such a machine a worthwhile object of invention. This is well demonstrated in my machine, which snips off trees with surpassing speed and ease without danger to the operator.

As to the commercial importance of the machine, the fact that it wastes no wood in sawdust could alone account for a saving of more than one million dollars in pulpwood in this country each year. The cutting speed with a 10 H. P. engine is at least double that of the best mobile power saws and it is 100% safe from all danger of cutting the operator. It operates for weeks without need of sharpening, and when the blade finally becomes dull, it can be resharpened in a few minutes with a file or oil stone. It has the exclusive advantage over all other cutters of being adaptable to engines of unlimited power. It could use a 100 H. P. engine and cut a tree in one second.

It is not enough to make a cutterhead to merely fell the trees, we must also be able to cut them cleanly into bolts as they lie flat on the ground. We must also transport the machine through the woods, and bring the cutterhead to the tree at just the right spot and at the right angle to make the cut. The requirements for a machine to perform tree cutting in this manner are rigorous and exacting to a remarkable degree. Though quite simple and logical now that it is finished, the design principles involved were conceived only after long and arduous research. The precise pattern of machine elements necessary for reliable operation has at last been determined and the tree cleaving machine is a practical reality.

The forces involved are tremendous, running up to 25 tons or more on a 13½" pine, yet to the eye the cut is made in a flash with consummate ease and safety. To successfully and safely employ such mighty forces in a mobile machine requires that the force must be applied and the blade guided in a very precise manner, else the cutterhead will twist around on the tree, the blade will run off askew and the cutterhead destroy itself.

This machine can roll nimbly along narrow forest trails under its own power, turn its "head" agilely to either side to snip off trees to right or left, rear up to cut them off four feet above the ground or nose over and cut them practically flush with the ground. After the tree is down, it rolls alongside and automatically measures off standard pulpwood billet lengths and snips the tree cleanly into bolts even though the logs may be lying flat on the ground.

It may therefore be stated that the broad object of my invention is to provide a complete and practical self propelled tree cutting machine, capable of traveling about under its own power and of both felling and bucking trees safely at high speed.

Another object is to leave a low stump in felling, for wood conservation and to leave the woods clear for subsequent operations.

Another object is to direct the fall of the tree.

Another object is to provide a cutterhead capable of severing logs lying flat on the ground without necessity of raising them.

In the drawings (4 sheets):

Fig. 1 is a side elevation of the complete vehicle shown in a traveling attitude, with the left wheel removed for clarity. The cutterhead is shown in outline only.

Fig. 2 is a plan view of the complete vehicle.

Fig. 3 is a side elevation of the moving jaw type cutterhead shown bucking a log lying flat on the ground, with portions broken away to show internal construction.

Fig. 4 is a side elevation of the moving jaw type cutterhead looking into the open jaw.

Fig. 5 is a transverse section taken along line 5—5 in Fig. 4.

Fig. 7 is a side elevation of the moving blade type cutterhead shown bucking a log lying flat on the ground.

Fig. 8 is a side elevation of the moving blade type cutterhead looking into the open jaw, with portions broken away to show internal construction.

Fig. 9 is a transverse section of the moving blade type cutterhead taken along line 9—9 in Fig. 8.

Fig. 10 is a side elevation showing an alternate jaw without teeth.

Figure 6:
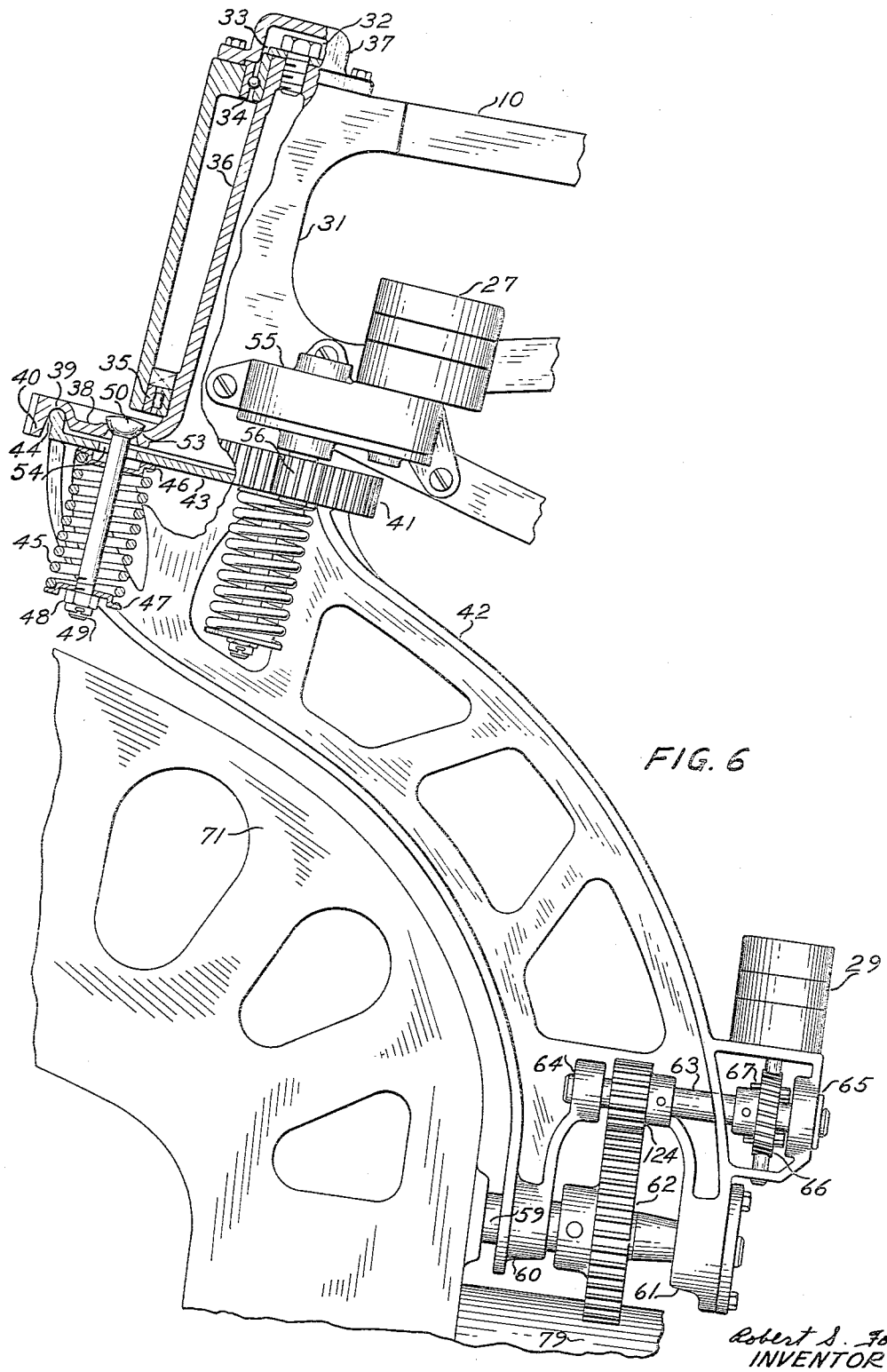
Fig. 6 is a large scale side elevation of the elastic suspension bracket and gearing.

Referring to Figs. 1 and 2, it may be seen that the machine consists of a power driven two wheeled vehicle, supporting a forwardly mounted cutterhead by a swingable elastic suspension. The preferred type of cutterhead, detailed in Figs. 3, 4, and 5, is shown on the vehicle. An alternate type of cutterhead is detailed in Figs. 7, 8, 9, and 10. The elastic suspension is detailed in Fig. 6.

Referring to Figs. 1 and 2 more closely, it may be seen that the vehicle comprises a welded steel frame 10, supported by a differential geared axle 11, and fitted with rubber tired wheels 12 and 13. This axle is powered and braked by a geared fluid motor 14, which is fed with oil flow from pump 15 operated by engine 16. The oil from the pump 15 passes first through multiple unit control valve 17 and recirculates freely back to tank 18 when the vehicle is at rest. To actuate the vehicle drive ahead, the operator twists handle 19 clockwise, which operates valve stem 20 through eccentric 21 and rod 22, thus directing oil flow through connecting hose lines (not shown) to fluid motor 14, causing it to power the wheels for ahead motion. To stop, the operator recenters the handle 19, which puts the pump flow back on free recirculation and blocks the oil in the fluid motor 14, thus braking it to a stop. Reverse vehicle motion is obtained by counterclockwise rotation of the handle 19, which throws oil flow into the fluid motor for reverse rotation. Smooth starts and stops are secured by machining the spool in control valve 17 with tapered V grooves instead of with square edged lands. The grooves governing oil return to tank are made slightly shorter than the inlet grooves in order to brake the oil emerging from the motor in stopping meanwhile allowing oil to enter the motor freely so that the motor may remain full of oil. This method of spool grooving modulates the oil flow gently and smoothly, allowing the vehicle to be handled with delicacy and precision, yet with giant power. With this control the vehicle can be inched around in the thickest woods, eased down steep hills, and has power enough to spin the wheels on the ground if it is run against an obstacle. The handle 19 is concentrically mounted on a sturdy straight shaft 23 which rotates in bearings inside mounting tube 95, so the operator can support and guide the machine by the handle entirely independent of the propulsion control obtained by twisting it. The mounting tubes as at 95 are secured to the frame by U bolts as at 68, tack welded to the tubes. Handles 24, 25, and 26 are similarly constructed and are operatively connected to the other three elements of the valve 17, to control the other three functions of the machine, namely: Handle 24 controls fluid motor 27 to swing the cutterhead 28 from side to side, handle 25 controls fluid motor 29 to tilt the cutterhead 28 into either a horizontal or a vertical position for felling or bucking, and handle 26 controls the cutting jaw action to open or close the jaw.

Control valve 17 is a Vickers model CM2 valve, standard except for the specially grooved spools described above in the three fluid motor control sections only. Relief valves should be applied between the two outlet connections from each valve to protect the equipment from shocks and overloads, and to allow individual pressure settings to accommodate the power requirements of each of the four functions.

A separate engine governor control 30 is provided to control engine speed. This control varies the governor setting, so the engine can be held at any selected speed.

These five controls, namely propulsion, cutter swinging, cutter tilting, cutting, and speed, accomplish the entire control of the machine under power. The operator's strength is used only to guide the machine and stabilize the balancing on the axle 11. The machine is balanced when in traveling position, but will remain in position when tilted over either forward or backward owing to the center of gravity being higher than the axle.

The cutterhead 28 is suspended from the frame 10 by an elastic yielding suspension detailed in Fig. 6. This suspension assembly is constructed so that it may yield in any direction should the cutterhead be subjected to sudden shock or blows, or should the cutterhead shift its position as it cuts. Since we are dealing with giant power in this machine, this yielding is necessary to prevent breakage. Often the cutterhead is hammered by the butts of falling trees, and also it occasionally shifts with deliberate but irresistible force as it bites through the tree, and would therefore break loose from the vehicle were it not elastically suspended and allowed to yield.

Referring to Fig. 6, a bearing housing 31 is welded to the frame 10, and contains two antifriction bearings 34 and 35. These bearings support a hollow spindle 36 locked by screw 32 and washer 33 to the upper bearing 34, which in turn is locked in place by cap 37. The lower end of this spindle is flared out into a circular plate 38 which is provided with a rounded annular groove 39 and a downwardly projecting rim 40, the outside of which is milled with gear teeth 41. A bracket arm 42 supporting the cutterhead is fitted at the upper end with a disk 43 having its periphery turned up all around into a skirt with a rounded edge 44 which fits loosely within and is retained by groove 39 and the interior of rim 40. In other words, the top of the bracket 42 is socketed into the underside of the spindle plate 38, and is elastically retained there by four bolt and spring assemblies as at 45. This assembly consists of a powerful compression spring 45 assembled under 50% preload, recessed washers 46 and 47 and a nut 48 retaining the spring, and a bolt 49 with a hemispherical head 50 transmitting the spring tension to the plate 38. The bolt head 50 is socketed in a depressed seating 53 in the plate 38, and passes through a loosely fitting hole 54 in the disk 43. The aggregate force of these four spring units is considerably more than necessary to suspend the weight of the cutterhead, so the disk and plate are normally held securely clamped together so as to form a stable connection under all normal conditions of load and motion. However, should the cutterhead be struck a blow or subjected to excessive forces, the disk 43 may be tilted within the confines of rim 40, and thus yield elastically to the disturbing force to avoid damage. Immediately the excessive force is removed, the spring units snap the disk back in place as before, the bolt shanks guiding in the disk holes.

As earlier stated, fluid motor 27 controlled by valve 17 and handle 24 serves to swing the cutterhead from one side to the other as required. This fluid motor transmits its motion through gear box 55 and pinion 56 to the gear teeth 41 on the spindle plate rim 40, thus indexing it as required to gain the desired position of the cutterhead suspended below. As previously stated, the fluid circuit supplying fluid motor 27 is fitted with relief valves so the motor can be forced to rotate by outside forces in emergency. In other words, the motor can yield to excessive forces applied to the cutterhead.

An elastic stop unit 51 (Fig. 2) containing a spring and plungers 57 and 58 is provided on the plate 38 and arranged to strike the gear box 55 on the left side and the frame 10 on the right side to limit the swing of cutterhead and prevent its being rotated too far.

The cutterhead is articulated to the bracket arm 42 by means of a stout shaft 59 (Fig. 6) imbedded in the cutterhead at one end and supported by bearings 60 and 61 housed in the bracket arm 42. A spur gear segment 62 is secured to this shaft, mating with a pinion 124 mounted on a jackshaft 63 also journaled in the bracket arm, at bearings 64 and 65. This jackshaft carries a worm gear 66, engaging a worm 67 mounted on the shaft of a fluid motor 29, previously mentioned. By this train of gearing, the motion of motor 29 in response to manipulation of handle 25 is transmitted to the cutterhead to tilt it about as required for both felling and bucking. The worm gear is of the overhauling variety, so that in event of excessive forces being applied to the cutterhead the gear train can rotate and allow the fluid motor 29 to yield and give to the strain, the oil displaced going through the relief valves previously mentioned.

Referring to Figs. 3, 4 and 5, it may be seen that the cutterhead comprises a hollow frame 71 cast in yoke shape, with one end formed into a flattened and tapered blade 72 with a symmetrical wedge shaped cross section. The deeply re-entrant rounded cavity 73 is provided to permit the stress in the metal on the inside of the curve to be spread out over an area of suitable depth and cross section to carry the load, and yet permit a sharp keenly tapered edge to be carried all the way up into the throat of the yoke. It will be noted that the blade tip is masked by the fins at 74 to prevent wood fibers being wedged uncut into the cavity 73, and yet this allows the blade tip to be free of the yoke 71 and have clearance for sharpening right up to the inner tip. This is extremely important, because if the thin, keen blade edge were joined to the yoke 71, it would create a stress concentration which would very quickly start a rapidly spreading crack and cause the whole blade section to break off under the tremendous loads involved. The blade is thickest at the edge of cavity 73 and grows progressively thinner and more keenly tapered toward the outer tip 75.

The rear end of the yoke 71 is formed into a split hub 76 and provided with a cap 77 secured by four capscrews as at 78 to clamp a hydraulic cylinder 79. Matching abutments at 90 on cylinder and hub keep the cylinder from sliding out when under load. A tubular ram 80 is fitted into the cylinder 79, and provided at the inner end with a piston head 81 and at the outer end with a ram jaw 82 secured together by three drawbolts as at 83. Packings 84 and 85 prevent oil leakage past piston and ram. The rear end of the cylinder is sealed by a head 86 secured by a snap ring 87 imbedded in a groove in the cylinder wall. Pipe fitting 88 is secured swivel fashion in the cylinder head. The cylinder wall is pierced by a pipe fitting 89 at the forward end. Fittings 88 and 89 are connected by flexible hoses (not shown) to the control valve 17, whereby oil under pressure may be alternately admitted or exhausted to the two fittings subject to the operator's manipulation of handle 26, thus forcing the ram 80 with its jaw 82 out toward the blade and back again. The ram stroke is arrested at the extremities of its travel by contact of the piston head 81 against the cylinder head 86 on one end and the shoulder 128 on the other. The ram and jaw are prevented from rotating by roller 91 bolted to the jaw 82 and rolling in a groove 92 formed into the throat of yoke 71.

The jaw 82 is bifurcated so the two sides straddle the blade edge but do not touch it at full stroke. The jaw sides are deeply notched to form teeth adapted to bite into the wood and hold it securely, and also to equalize the load between the two jaw halves by allowing both sides to sink in and find equal resistance in the wood. It is important that these jaw halves be symmetrically located on each side of the blade edge. It is also desirable to have the gap between jaw halves as narrow as can be and avoid striking the blade edge, and to have the jaw halves themselves very narrow. These conditions are necessary to assure a balanced solid grip on the uneven surface of the tree and an absolutely straight push toward the blade edge, otherwise the blade will run askew and cause breakage.

It will be noted that the outer blade tip 75 projects considerably below the jaw 82, for the purpose illustrated in Fig. 3, namely to insure enough reach to bite into the earth below the log 69 and cut it all the way through. This feature, while simple and obvious after it is disclosed, is of key importance in the bucking performance of the machine.

The blade edge 94 is tipped 17 degrees out of perpendicular relation to the cylinder axis to direct the fall of the tree away from the cylinder. The wedge shaped blade forces trees to fall nearly perpendicular to the blade edge. The blade taper from root to outer tip also influences the tree to fall still further out of line with the cylinder.

It has been found that the 17 degree blade angle causes a tendency for a log 69 to rotate counterclockwise as viewed in Fig. 3, so the toothed jaw 82 has been tipped by a lesser amount, about 5 degrees from perpendicular, in order to counterbalance and arrest this rotation. By such a combination of cutting angles with the toothed jaws, there is no tendency for the log to slip or roll out of the grip as it is being cut.

The pump 15 and engine 16 should be so proportioned in pump capacity versus engine power that the engine will continuously generate only sufficient pressure to cut a log about ½ the maximum capacity of the cutterhead. On logs larger that this ½ size, the engine will lug down and begin to stall as the blade bites in near the center of the cut, whereupon the operator recenters the handle 26 momentarily thus unloading the engine so it can regain speed, then the blade stroke is resumed with the engine flywheel momentum furnishing the excess power required. It is seldom necessary to do this more than twice even in a large tree, because the blade will move three or four inches in each spurt. To get the best efficiency, the cutting control section of valve 17 should have what the hydraulic trade calls "center blocked cylinder ports" so as to statically maintain the previously developed jaw force while the engine is catching up speed. The idea of thus deliberately overloading the engine is to get top cutting speed and efficiency in small to medium diameter trees, which constitute the overwhelming majority of the work. Even in large trees, this practice gives a net gain in speed, since the overloading occurs only in the center section of the cut, and the blade enters and leaves very rapidly under moderate load. No harm is done to the engine, since the overload lasts no more than two seconds at a time. An extra heavy flywheel is desirable.

Referring to Figs. 3 and 7, it may be noted that both types of cutterhead must be supported at a downward angle with reference to the ground for proper action, with the Fig. 7 type tipped down at the greater angle. This condition is obtained by means shown in Fig. 1, by tilting the spindle 36 backward with reference to the vehicle, and by tilting the shaft 59 downward with reference to the spindle. When the cutterhead is in the straight ahead position, the spindle angle holds it up so when the vehicle is nosed over for a cut, the cutterhead will lean forward at the proper angle. When the cutterhead is swung to the sidewise position, the effect of the spindle angle disappears, and we have the downward angle of shaft 59 with reference to the now vertical plane of the spindle to provide the proper downward slope. The bracket arm 42 is so proportioned as to bring the center of gravity of the cutterhead approximately in line with spindle 36, so as to avoid disturbing the overall balance of the vehicle as the cutterhead is swung about.

Referring to Figs. 1 and 2, it may be seen that pointers 97 and 98 are provided on either side of the vehicle, located at a distance from the cutterhead when in crosswise position equal to the length of a standard pulpwood billet. Thus when one of these pointers is brought to the butt of a log, and a cut made with the cutterhead crosswise, the resulting billet is of standard pulpwood length. The pointers are made of rubber hose to avoid catching and breaking in the brush.

Hand guards as at 52 are fitted on either side to protect the operator's hands from bumping trees in thick forests.

Fig. 4 shows a tree 96 in broken lines with cutterhead in position for felling.

Operation of the machine in felling is described as follows: The operator starts the engine, grasps handles 19 and 26 and manually tilts the vehicle to the traveling attitude with the cutterhead head clear of the ground. He then shifts his grip to handles 24 and 25, and by twisting them swings and tilts the cutterhead under power to a position roughly crosswise with respect to the vehicle and with the blade horizontal and the open jaw forward. The blade may be on either the left or right hand side as required by terrain. The operator shifts his grip back to handles 19 and 26, and by twisting handle 19 as earlier described makes the vehicle travel under power, turning the handle clockwise for ahead motion, counterclockwise for reverse, and centering it for braking. The selected tree is thus approached and engaged by the gaping jaw of the cutterhead. The operator allows the vehicle to tilt over forward so the cutterhead rests on the earth, opens the throttle 30, and twists handle 26 counterclockwise, which positions valve 17 to direct oil into the head end of cutterhead cylinder 79. The oil pressure forces the ram out with its jaw 82 against the tree. The jaw teeth strike the tree and stop, but the cylinder then starts moving backward due to the cylinder reaction from the ram thrust. The yoke 71 and attached blade 72 move backward with the cylinder, and the blade is thus pulled into and through the tree by the full force of the ram thrust reacting through the cylinder. The jaw teeth bite in evenly and firmly hold the tree against the blade. The terrific pinching action of the tree fibers on the blade tends to stop the cut and deflect the blade, but the long yoke is pulling the blade with irresistible power and holding it straight as well, so it cleaves cleanly through the wood and, forcing the cut apart, it wedges the tree on over substantially at right angles to the vehicle. The operator watches the tree, not the blade, and of course sees the tree begin to lean progressively as the blade bites in.

When he sees the tree make a quick sway and begin to fall, that is the signal that the cut is nearly through, so he twists handles 19 and 26 both inward which, by action of hydraulic power through valve 17 as earlier described, causes the ram to retract and the vehicle to roll backward clear of the falling tree. It is thus quite easy to clear the tree by several feet before it falls, and even if the operator fails to back clear no harm is done. In such a case the tree butt will sometimes thrash and bounce as it falls and may give the cutterhead a jolt, which the elastic suspension will absorb without harm. It is good practice to leave an inch or so of wood uncut, to give the tree a hinge to tip over on, stabilizing the fall and preventing its bouncing as it strikes the ground. This shred usually will break off at the last moment, and when it doesn't it is easily severed with an axe blow by the trimmer.

The above description sounds rather tedious, but in practice the operation is accomplished with such speed that four or five trees could easily be felled while one is reading the preceding paragraph.

To buck the fallen trees into logs the operator twists handle 25 to tilt the cutterhead under power so that the blade tip projects straight down. If space conditions permit, the best cutterhead position is at right angles to the vehicle to either right or left. With the cutterhead thus positioned crosswise the vehicle is driven along parallel to the fallen tree with the open jaw over the tree trunk, and is halted with the pointer 97 or 98 opposite the butt of the log. The jaw is thus located to cut off a measured billet. The vehicle is then tilted forward, dropping the open jaw down over the log, so that the blade tip enters the earth or at least goes below the log. Handle 26 is twisted, and the jaw 82 pushes against the log and draws the blade through the log, cutting it off. The vehicle is then driven forward until the pointer is opposite the cut, measuring off another length ready for the next cut.

In practice, it often happens that the myriad of bushes, stumps, etc. will interfere with the above optimum procedure of bucking and the log must be approached as space conditions permit. In such cases, the cutterhead may be swung around to the straight ahead position or to various other angles to suit the work. With the power indexing control, the cutterhead may be swung about almost instantaneously.

As the blade is dragged through a tree, the yoke and hence the forward end of the vehicle moves with it. The vehicle simply swings and moves with the cutterhead, the wheels rolling as necessary, with the oil displaced by the rotation of fluid motor 14 passing through the relief valves.

Referring to Figs. 7, 8, 9, and 10, the alternate form of cutterhead is analogous to the preferred form except that it is reversed, with the blade moving and the split jaw stationary. The blade 99 is a flat ground rectangular steel plate with a symmetrically sharpened edge, and fitted with identical wedges 100 and 101 riveted to opposite sides of the blade along its centerline. The rear portion of the blade is serrated with parallel grooves 102 mating with similar grooves in a palm 103 to which it is secured by two bolts as at 104. These bolts pass through elongated holes as at 105, so the blade may be shifted out one serration at a time as it wears down at the edge. This serrated palm type connection is employed to obtain an absolutely rigid joint between blade and ram, so that the ram may help guide the blade.

The palm 103 is integral with a ram head 106 shrunk into the tubular ram 107 and secured by a center draw bolt 108, which also secures the piston 109 on the opposite end of the ram. The piston works in a cylinder 110 which is fitted with a cylinder head 111 brazed in place, and is locked to the cutterhead body 112 by a split grooved ring 113 engaging projecting flanges on body and cylinder and clamped by two cap screws as at 114. A flanged bushing 115 encircles the ram and retains the packing 116 for sealing the ram.

The body 112 is milled out at the sides to receive bronze guide bars 117 and 118 which are grooved to fit the blade and are held in place by bolts as at 119 drilled through at an angle and so arranged as to hold the bars both inward and upward in their seatings securely. It will be noted (Fig. 8) that the guide on the yoke side is extended across the gap by an additional separate section of guide bar 118.

The body 112 is shaped into an arch 123 curving into a split jaw 121 opposing the blade edge and provided with teeth. This jaw is split and recessed in the center to receive the blade without touching it, and the recess is made as narrow as possible, and also the toothed jaw sections are quite narrow, for the same operative reasons discussed earlier. It will be noted that this jaw 121 is considerably shorter than the blade width, so it will allow the cutterhead to drop down low enough across a log 93 so the blade will plow into the earth and cut the log completely even though it is lying flat on the earth.

The arch portion 123 of the body 112 may be seen in Fig. 8 to be set into the body at an angle, so that the rear portion of the arch is offset upward to clear the blade and yet carry the strength of the arch on around the curve to the opposite side of the body. The offset portion of this arch is fitted with bosses 129 and 130 to act as stroke stops against ram head 106. The rearward ram stroke is arrested by the piston 109 contacting the cylinder head 111.

The blade 99 is somewhat longer than the width of the cutting edge, to allow for the ram connection and to span the rearward portion of the arch. The edges of the blade operate in the bronze guide bar grooves and the blade is thereby guided throughout its stroke, even across the open gap. These guides are subjected to considerable wear even if well lubricated, and this is one of the reasons why they are made removable and replaceable. The other reason is that they must be made of a special bearing bronze to avoid galling under this severe service.

The distinctive pattern of ribs and flanges comprising the body of this cutterhead has been carefully worked out to achieve the various space relations for the working parts and to follow the natural stress lines involved, providing a structure of remarkable strength with light weight. This casting weighs only 160 pounds, yet carries the 25 ton load on the jaw readily.

Since the blade edge is in this form square with the cylinder axis, it is possible to omit the teeth in the jaw, as shown in Fig. 10, by providing instead two straight ridges as at 125 slightly arched to a low point in the center. The same principles apply regarding the narrow recess between the ridges, and the ridges themselves should be very narrow, insuring a solid straight seating on the tree. The arched form of the ribs usually avoids any tendency for the tree to slip out the jaw, but once in a while an oval log will slip and rotate, so the toothed form is preferable.

Pipe connections 122 and 126 are connected by flexible hoses (not shown) to the valve 17, for application of hydraulic power as earlier described to operate the blade.

This alternate cutterhead is used on the same vehicle with a similar suspension altered only to present the cutterhead at the slightly steeper angle referenced to the earth which it requires. The cutting action is similar, but reversed, the open jaw being engaged around the tree, hydraulic power applied to the cylinder, the blade edge contacts the tree and pulls the fixed jaw against the opposite side, whereupon the blade continues moving into and cutting the tree against the fixed jaw. The wedges 100 and 101 assist in relieving the pinching and throw the tree straight in line with the blade stroke.

The handling and operation of the vehicle is the same except that the tree falls oppositely from the way it does with the other cutterhead, giving this cutterhead the advantage of being able to fell a tree in the straight ahead position. This of course cannot be done with the other cutterhead because the tree would fall back on machine and operator.

The Fig. 7 form of cutterhead is perhaps preferable from a performance standpoint, owing to the fact that the body is stationary while the blade is cutting. However, it is very much more expensive than the Fig. 3 form, owing to the highly finished parts such as the blade, guides, serrated palm etc., and requires more maintenance and lubrication. Whereas the Fig. 3 form employs a minimum of parts, is only about one third as costly and requires practically no maintenance. It is a rugged, powerful and nearly indestructible tool and therefore better suited to this severe service. For this reason I presently prefer the Fig. 3 form. Also the Fig. 3 form with the hooked blade has a marked advantage in felling, in that trees are felled toward the open space in which the machine is operated, avoiding frequent entangling and interference with standing trees. With this form it is possible to pluck away one or more trees out of a crowded clump, which is more difficult with the Fig. 7 form because it basically fells away from the machine and thus toward the woods.

I claim as my invention:

1. In a tree cutting machine, the combination of a jaw, a blade opposing the jaw, and means whereby the blade and jaw may be alternately brought together and gaped apart in a straight line stroke, said blade having the extremity of the cutting edge projecting beyond the tip of the jaw when the blade is at the extremity of its stroke toward the jaw, whereby the projecting portion of the blade edge may be forced into the earth beneath a log and thus be brought down far enough to fully sever the log against the co-acting jaw.

2. In a tree cutting cutterhead, the combination of a body, a blade fitted to slide in guides provided in the body, and an arch set into the body by its near arm with said near arm offset above the plane of the blade with the plane of the arch lying at an angle with respect to the plane of the blade so that the remote arm of the arch forms a jaw symmetrically opposing the blade edge and the near arm lies above and clear of the blade whereby the arch is joined to the body above the blade thus permitting the blade to be brought very close to the ground so as to leave a low stump.

3. In a tree cutting cutterhead, a power operated moving jaw, a yoke supporting the jaw, a blade opposing the jaw and secured to the yoke with a re-entrant recess lying behind the blade edge whereby increased stress carrying area is obtained on the inside of the yoke, and a pair of fins attached to the yoke and adapted to mask the blade tip and prevent the passage of uncut material into the recess.

4. In a tree cutting cutterhead, a power operated moving jaw for movement in a straight line, a yoke supporting the jaw, a blade secured to the yoke and obliquely opposing the jaw with the blade edge at an angle greater than 90 degrees from the line of jaw action measured in a direction away from the yoke and jaw, whereby the path of falling trees may be directed away from the cutterhead at an angle.

5. A combination as in claim 4 where the jaw is also tilted with respect to the line of action of the jaw in the same direction as the blade is tilted but to a lesser degree.

6. A combination as in claim 4 wherein the wedge shaped blade cross section is more obtuse and thicker near the yoke and progressively becomes thinner and more acute toward the tip, whereby the wedging effect in the tree is directed away from the yoke, forcing the direction of fall away from the yoke.

7. A combination as in claim 4 wherein the jaw is provided with teeth whereby the tree is gripped more securely.

References Cited in the file of this patent

UNITED STATES PATENTS

| | | |
|---|---|---|
| 183,638 | Byrnes et al. | Oct. 24, 1876 |
| 872,213 | Bailey | Nov. 26, 1907 |
| 929,118 | Buckwalter | July 27, 1909 |
| 1,512,181 | Knechtel | Oct. 21, 1924 |
| 1,678,999 | Murray | July 31, 1928 |
| 1,737,433 | Rowntree | Nov. 26, 1929 |
| 1,820,775 | Boyette | Aug. 25, 1931 |
| 1,891,526 | Dupuis | Dec. 20, 1932 |
| 2,236,833 | Pell et al. | Apr. 1, 1941 |
| 2,269,914 | Parker | Jan. 13, 1942 |
| 2,332,561 | Drott | Oct. 26, 1943 |
| 2,385,419 | Matulich | Sept. 25, 1945 |
| 2,411,623 | Jaques | Nov. 26, 1946 |
| 2,461,188 | Stoner | Feb. 8, 1949 |
| 2,493,696 | Potstada | Jan. 3, 1950 |
| 2,543,109 | Holowka | Feb. 27, 1951 |
| 2,565,252 | McFaull | Aug. 21, 1951 |

FOREIGN PATENTS

| | | |
|---|---|---|
| 1,068 | Great Britain | Apr. 28, 1864 |
| 209,905 | Great Britain | Jan. 24, 1924 |
| 115,148 | Australia | May 12, 1942 |